April 7, 1925.　　　J. A. JOHNSON　　　1,532,496
OBJECT TESTING APPARATUS
Filed Sept. 20, 1923　　　3 Sheets-Sheet 3
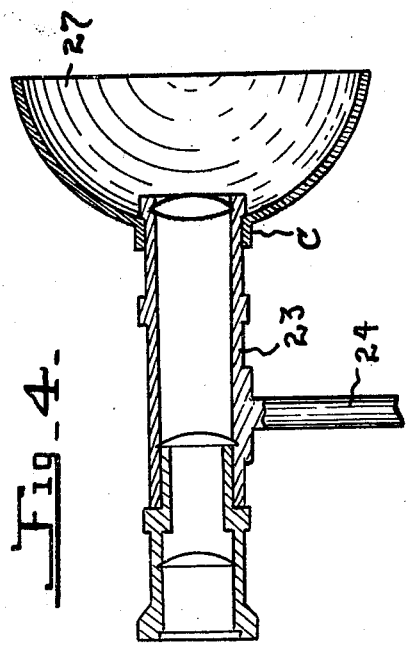
Inventor
John A. Johnson,
By Hiram A. Sturges,
Attorney Patented Apr. 7, 1925.

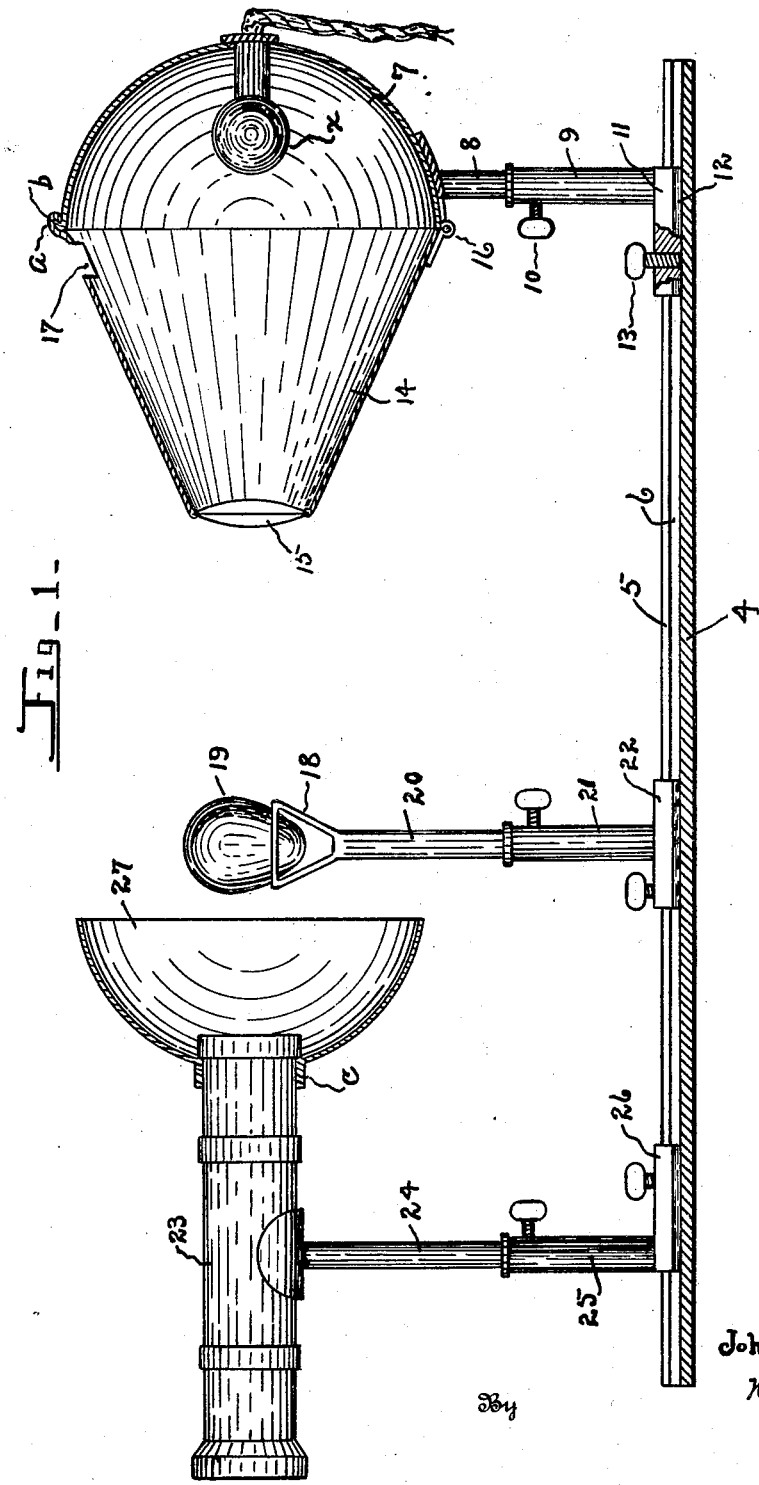

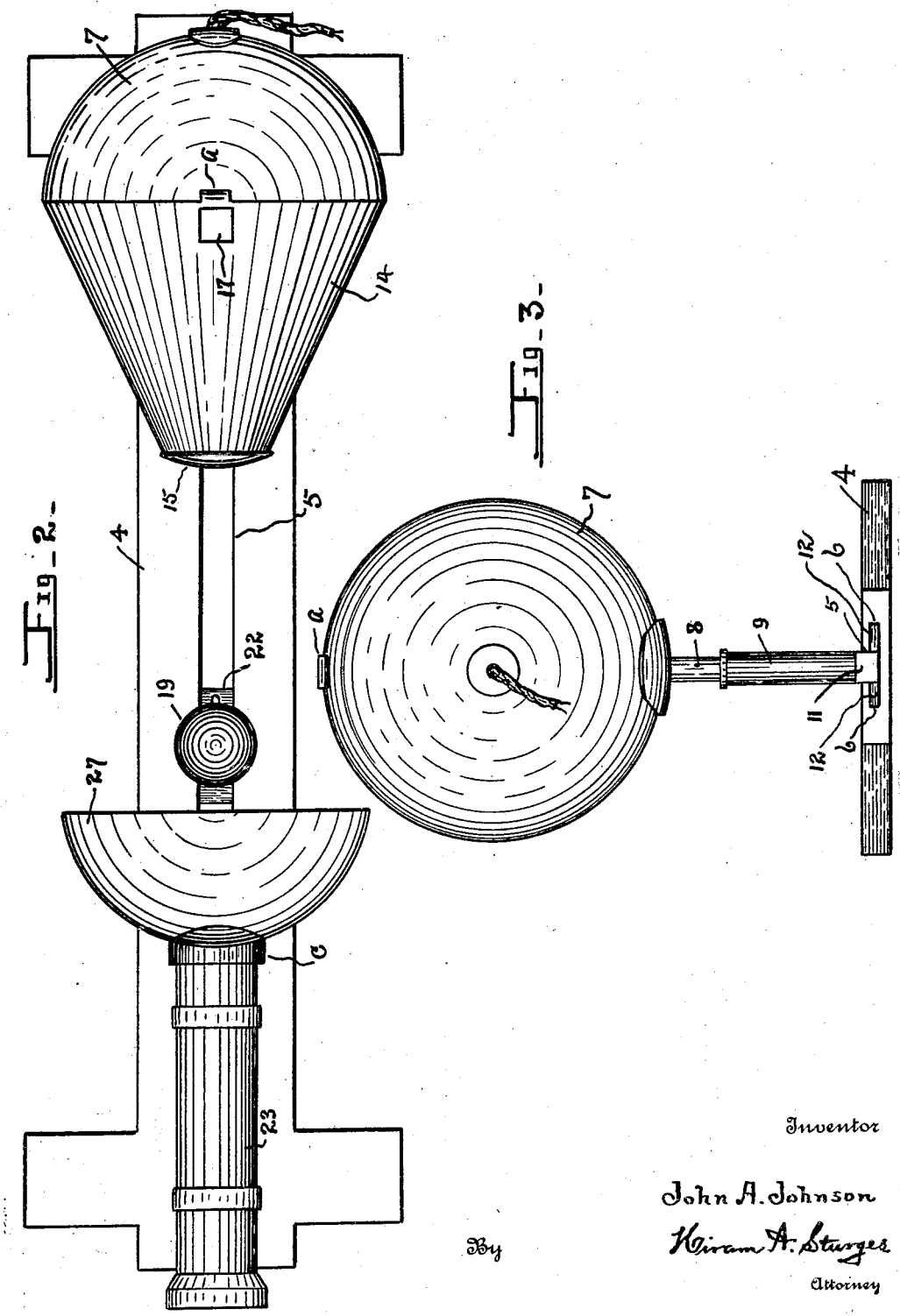

1,532,496

UNITED STATES PATENT OFFICE.

JOHN A. JOHNSON, OF COLLEGE SPRINGS, IOWA.

OBJECT-TESTING APPARATUS.

Application filed September 20, 1923. Serial No. 663,912.

*To all whom it may concern:*

Be it known that I, JOHN A. JOHNSON, a citizen of the United States, residing at College Springs, in the county of Page and State of Iowa, have invented certain new and useful Improvements in an Object-Testing Apparatus, of which the following is a specification.

This invention relates to an apparatus for the examination of small objects to visibly determine their structural parts and particularly to ascertain imperfections in transparent or semi transparent bodies, and has for its object, broadly, to provide a portable device for these purposes which will consist of few and simple parts and will be convenient in use.

The novel and useful features of the invention are fully described herein and are illustrated in the accompanying drawing, wherein,—Fig. 1 is a view of the apparatus in side elevation, parts being in section. Fig. 2 is a plan view of the apparatus, and Fig. 3 is a rear end view of the same.

Fig. 4 is a detail showing an optical instrument in longitudinal section.

In the drawing, numeral 4 indicates an elongated support or base, of any suitable length or width, having a slot 5 formed therein, and having recesses 6 opening on the slot.

At 7 is indicated a concavo-convex mirror or reflector provided at its medial line with a lamp $x$, and adapted to be adjusted vertically since it is provided with a stem 8 slidingly mounted in a tubular standard 9, said stem being adapted to be secured stationary with the standard by means of a set-screw 10. The standard 9 together with the reflector, may be adjusted longitudinally of the support since it is provided with a foot-piece 11 adapted to engage in the slot 5, and having projections 12 for engaging in the recesses 6, a set-screw 13 being employed for securing the standard stationary with the support after an adjustment has been made.

Numeral 14 indicates a forwardly convergent shutter having a diameter at its inner end corresponding to the diameter of the reflector at its perimeter, its convergent end being provided with a lens 15. It may be secured to the reflector by any suitable means, the means shown herein and preferred for this purpose being a hinge 16, and opposite thereto, a catch $a$ on the shutter adapted to engage a projection $b$ which is provided for the reflector, a vent aperture 17 being formed in the top of the device.

At 18 is indicated a holder for an object 19 to be examined, said holder being provided with a stem 20 mounted to permit vertical adjustments in a tubular standard 21, said standard and object 19 being adapted to be disposed nearer to or further from the lens since the foot-piece 22 of the standard may be adjusted longitudinally in the slot 5.

Numeral 23 indicates an optical instrument which may be of conventional construction for magnifying an object on the holder 18, said instrument being provided with a stem, as indicated at 24 which is adjustable in the tubular standard 25, and having a foot-piece 26 adapted to engage within and to be adjusted longitudinally of the slot 5.

It will thus be seen that adjustments may be made so that the rays of light from the reflector will be focalized to advantage to permit inspection of an object, the field of light from the reflector being limited to the area of the lens. Numeral 27 indicates an eye shield of concavo-convex form, having a flange $c$ slidingly mounted on the instrument, said shield operating to protect the eyesight of an operator. The concaved surface of this shield may be formed as a mirror to reflect the rays of light upon the object to be examined. However, in some instances it may be of advantage to provide a dark surface therefor, depending upon the variety or kind of object to be inspected. It will be noted that the funnel shaped shutter may be swung readily from its hingeable mounting whenever required and when secured in closed relation with the reflector the longitudinal axis of the lens will be in line with the longitudinal axis of said reflector, and since the parts required for the apparatus are few in number it may be operated conveniently.

It will be understood that changes in size, form, proportion and minor details may be made in constructing the apparatus, said changes being determined by the scope of the invention as claimed.

It is obvious that if the lens 15 was omitted, the apparatus would still be useful for many purposes, and I do not wish to be limited to the use of the lens.

I claim as my invention,—

1. In an object testing apparatus, a base support, a concaved reflector mounted on the support, a forwardly convergent shutter mounted on the reflector and provided with a lens, a holder for supporting an object to be tested, said holder being adjustably mounted on the support for disposing the supported object at selected distances from the lens in line with the longitudinal axis of the reflector and said lens.

2. In an object testing apparatus, a base support, a holder for supporting an object to be tested and mounted on the support, a concaved reflector, a shutter of funnel shape mounted on the reflector, a lens disposed with its axis in line with the axis of the reflector and mounted in the convergent end of the shutter, said reflector being adjustably mounted on the support to permit it to be disposed at selected distances from the object supported by said holder with its axis in line with the axis of said object.

3. In an object testing apparatus, a base support, a reflector mounted on the support, a shutter of funnel shape provided with a lens and mounted on the reflector, a holder for supporting an object to be inspected, said holder being adjustably mounted on the support for disposing the supported object at selected distances from the lens in line with the longitudinal axis of the reflector and said lens, and a tubular, optical instrument mounted to permit vertical and horizontal adjustments on the support with its longitudinal axis in line with the longitudinal axis of the reflector.

4. In an object testing apparatus, a base support, a concaved reflector mounted on the support, a funnel-shaped shutter provided with a lens and mounted on the reflector to permit swinging movements for disposing the lens with its longitudinal axis in line with the longitudinal axis of said reflector, a holder for supporting an object to be tested, said holder being adjustably mounted on the support for disposing the supported object at selected distances from the lens in line with the longitudinal axis of the reflector.

5. In an object testing apparatus, a base support, an optical instrument, a concaved reflector mounted on the support, a shutter of funnel shape mounted on the reflector, and a holder for supporting an object to be tested, said holder being adjustably mounted on the support for disposing the supported object at selected distances between the optical instrument and the convergent end of the shutter in line with the longitudinal axis of the reflector.

In testimony whereof, I have affixed my signature in presence of two witnesses.

JOHN A. JOHNSON.

Witnesses:
HIRAM A. STURGES,
ARTHUR H. STURGES.